United States Patent
Erwin et al.

(10) Patent No.: US 12,221,192 B1
(45) Date of Patent: Feb. 11, 2025

(54) NETWORKED COMMUNICATION RESCUE BUOYS

(71) Applicant: Government of the United States, as represented by the Secretary of the Air Force, Wright-Patterson AFB, OH (US)

(72) Inventors: William Erwin, Oakwood, OH (US); Hayk Azatyan, Springfield, OH (US); Anthony Ligouri, Bellbrook, OH (US); Travis Rennich, Kettering, OH (US); David Shald, Dayton, OH (US); Adam Warren, Fairborn, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 549 days.

(21) Appl. No.: 17/575,675

(22) Filed: Jan. 14, 2022

Related U.S. Application Data

(60) Provisional application No. 63/141,716, filed on Jan. 26, 2021.

(51) Int. Cl.
 *B63B 22/00* (2006.01)
 *B63B 45/00* (2006.01)
 (Continued)

(52) U.S. Cl.
 CPC .............. *B63B 22/00* (2013.01); *B63B 45/00* (2013.01); *H04W 4/14* (2013.01); *B63B 2201/02* (2013.01); *B63B 2203/02* (2013.01); *H04W 84/18* (2013.01)

(58) Field of Classification Search
 CPC ..... B63B 22/00; B63B 45/00; B63B 2201/02; B63B 2203/02; H04W 4/14; H04W 84/18
 See application file for complete search history.

(56) References Cited

U.S. PATENT DOCUMENTS

| 4,063,323 A | 12/1977 | Salvarezza |
|---|---|---|
| 4,579,536 A | 4/1986 | Cameron |

(Continued)

FOREIGN PATENT DOCUMENTS

| CN | 205239865 U | 5/2016 |
|---|---|---|
| CN | 109178216 A | 1/2019 |
| KR | 20180038772 A | 4/2018 |

OTHER PUBLICATIONS

U.S. Appl. No. 17/501,009, filed Oct. 14, 2021, Sauder, II, et al.

*Primary Examiner* — Stephen P Avila
(74) *Attorney, Agent, or Firm* — AFMCLO/JAZ; Jeffrey V. Bamber

(57) ABSTRACT

A buoy, and systems and methods for rescuing people isolated on large bodies of water are disclosed. The buoy includes a remotely activatable device that is activatable when a signal is received from a remote source. The activatable device may be a signaling device, or an assistance device that is deployable by the buoy to assist in rescuing a person. A marine communication system formed by a number of spaced apart rescue buoys is also provided. A message or key other information can be transmitted to every buoy in the network via communication with just one buoy. The methods for rescuing people isolated on large bodies of water involve providing the network of communication buoys that can receive communications from the isolated person's personal communication device, and then transmit a signal to remotely activate an activatable device in a buoy to assist in the rescue of the person.

16 Claims, 3 Drawing Sheets

(51) Int. Cl.
*H04W 4/14* (2009.01)
*H04W 84/18* (2009.01)

(56) References Cited

U.S. PATENT DOCUMENTS

| | | |
|---|---|---|
| 5,117,731 A | 6/1992 | Mendenhall |
| 6,484,662 B1 | 11/2002 | Perucca |
| 7,695,335 B2 | 4/2010 | Ricciutti et al. |
| 7,798,090 B2 | 9/2010 | Hatfield |
| 8,912,892 B2 | 12/2014 | Davoodi et al. |
| 8,917,175 B2 | 12/2014 | O'Regan et al. |
| 9,563,203 B2 | 2/2017 | Davoodi et al. |
| 9,637,209 B1 | 5/2017 | Brown |
| 9,638,829 B2 | 5/2017 | Davoodi et al. |
| 9,666,055 B2 | 5/2017 | Shau et al. |
| 9,709,396 B2 | 7/2017 | Chedrawy et al. |
| 9,781,248 B2 * | 10/2017 | Koepke ............ H04M 1/72421 |
| 10,067,507 B2 | 9/2018 | Davoodi et al. |
| 10,373,469 B2 | 8/2019 | Fernandez |
| 10,414,476 B2 | 9/2019 | Cole et al. |
| 11,740,221 B2 * | 8/2023 | Lewis .................... B63B 35/58 |
| | | 47/59 R |
| 2007/0241887 A1 | 10/2007 | Bertagna et al. |
| 2015/0346726 A1 * | 12/2015 | Davoodi ................ B63B 22/20 |
| | | 440/38 |

* cited by examiner

NETWORKED COMMUNICATION RESCUE BUOYS

Pursuant to 37 C.F.R. § 1.78 (a)(4), this application claims the benefit of and priority to prior filed co-pending Provisional Application Ser. No. 63/141,716, filed Jan. 26, 2021, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to buoys, and systems and methods for rescuing people isolated on large bodies of water.

BACKGROUND OF THE INVENTION

A person may become isolated (isolated person or "IP") on a large body of water and need to be rescued. A person lost in a large body of water is often too far away for direct communication with a rescuing aircraft or boat. If the person has satellite and GPS communication equipment in his or her possession, then the person might be able to transmit their location to far away searchers to enable a rescue. However, sometimes satellite equipment is either non-functional, or out-of-range.

Various types of communication networks are disclosed in the patent literature, and/or are commercially available. U.S. Pat. No. 10,067,507 B2, Davoodi, et al. discloses an invention made under a NASA contract that comprises controllable buoys and networked buoy systems.

The need for improved systems and methods for rescuing people isolated on large bodies of water has, however, continued. In particular, a need exists for systems and methods for rescuing people isolated on large bodies of water, which will provide the person to be rescued with additional assistance while they are awaiting rescue.

SUMMARY OF THE INVENTION

While the invention will be described in connection with certain embodiments, it will be understood that the invention is not limited to these embodiments. To the contrary, this invention includes all alternatives, modifications, and equivalents as may be included within the spirit and scope of the present invention.

A rescue buoy, systems, and methods for rescuing people isolated on large bodies of water are provided. The rescue buoy comprises a housing having an interior space, an interior surface, and an exterior surface. A buoy communication device is associated with the housing. The buoy communication device is configured for sending a signal to at least one of another buoy and a base station, and receiving a signal from a remote source. The rescue buoy also comprises a remotely activatable device that is associated with the housing. The remotely activatable device is activatable by the buoy when a signal is received by the buoy communication device from a remote source. The activatable device comprises at least one of a signaling device, or an assistance device that is deployable by the buoy. The buoy further comprises a power source electrically connected to the buoy communication device to power the buoy communication device and activate the activatable device.

A marine communication system is provided that comprises a plurality of spaced apart rescue buoys. Each buoy comprises a buoy communication device that is in communication with at least one other buoy to form a buoy communication network. The buoy communication device is configured for sending a signal to at least one of another buoy and a base station, and receiving a signal from a remote source. In addition, at least one of the rescue buoys comprises a remotely activatable device.

A method for rescuing a person on a body of water is also provided in which the person to be rescued has a personal communication device. The method comprises the steps of: a) providing a plurality of networked communication buoys (as described above) on a body of water prior to a person needing to be rescued; b) spacing said buoys apart on the body of water so that each buoy is in communication range with at least one other buoy; c) sending a message by a person on a body of water from their personal communication device; d) receiving the message by a first buoy; e) transmitting said message from said first buoy to at least one additional buoy and then to a base station; and f) transmitting a signal from the base station to remotely activate the activatable device in at least one buoy to assist in the rescue of the person.

Additional objects, advantages, and novel features of the invention will be set forth in part in the description which follows, and in part will become apparent to those ~2~ skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention relates generally to buoys, and systems, and methods for rescuing people isolated on large bodies of water.

Figure 1:
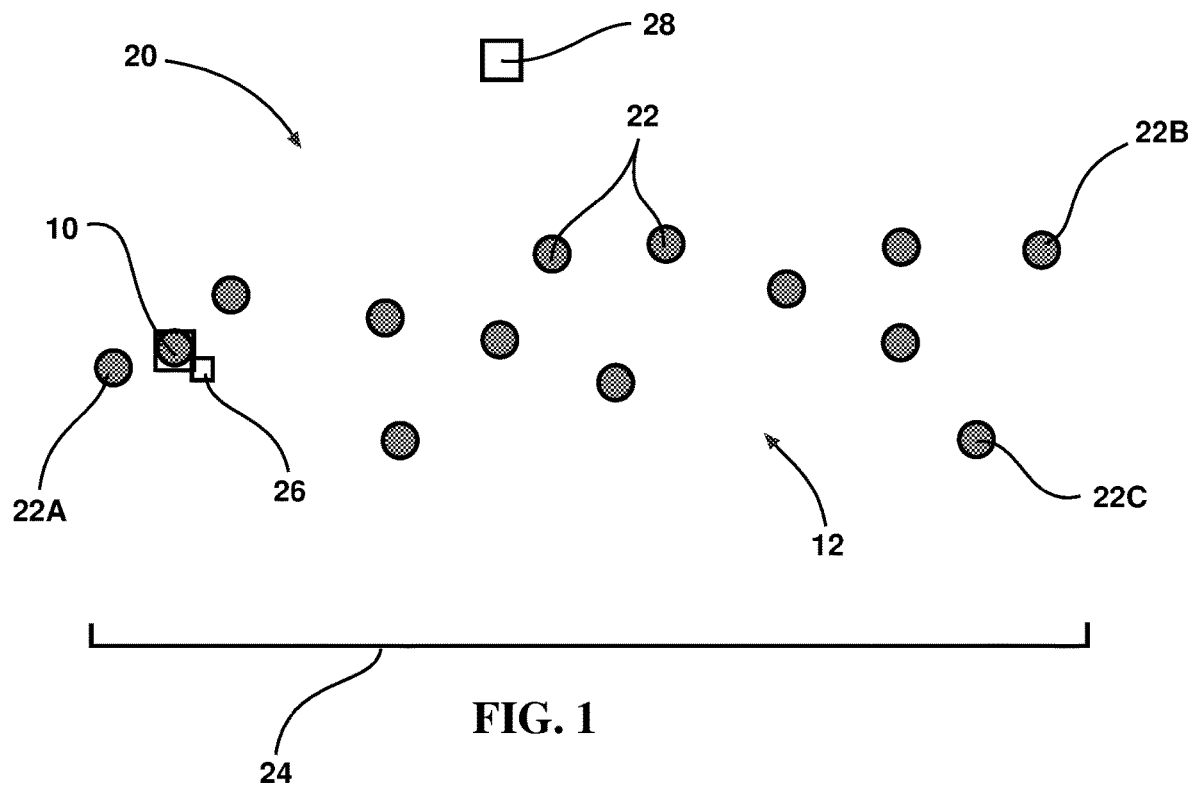
FIG. 1 is a schematic plan view of a networked buoy communication system.

FIG. 1 shows one non-limiting embodiment of a marine communication system ("system") comprising a plurality (or set) of networked buoys for assisting in rescuing an isolated person 10 on a body of water 12. The system 20 comprises a plurality of buoys 22 capable of providing a communications network 24 across the intended area of coverage. FIG. 1 shows a personal communication device 26 that a person can use to send and receive messages from within the buoy network 24. In some cases, the personal communication device 26 may be supplied as part of the communication system 20. In other cases, the person 10 may already have a personal communication device 26 that can communicate with the system 20. The communication system 20 may be in communication with a base station 28 outside the buoy network 24 that can send and receive messages to and from the buoy network. The buoys may be designated generally with reference number 22. Individual buoys may be designated 22A, 22B, 22C, etc.

Figure 2:
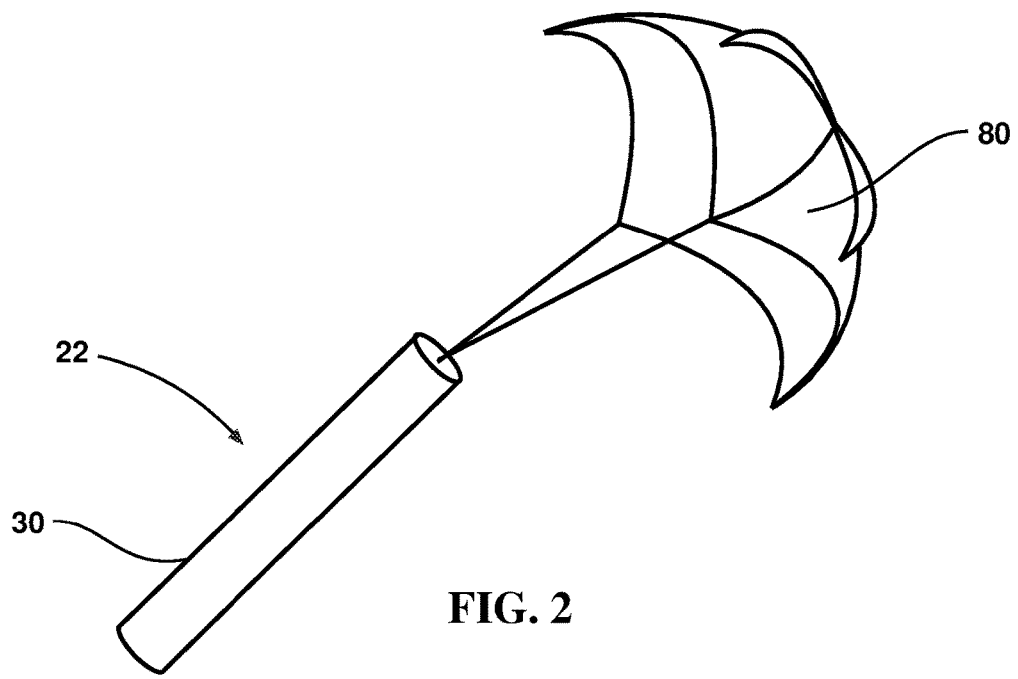
FIG. 2 is a perspective view of an embodiment of one of the buoys being dropped with a parachute.
Figure 3:
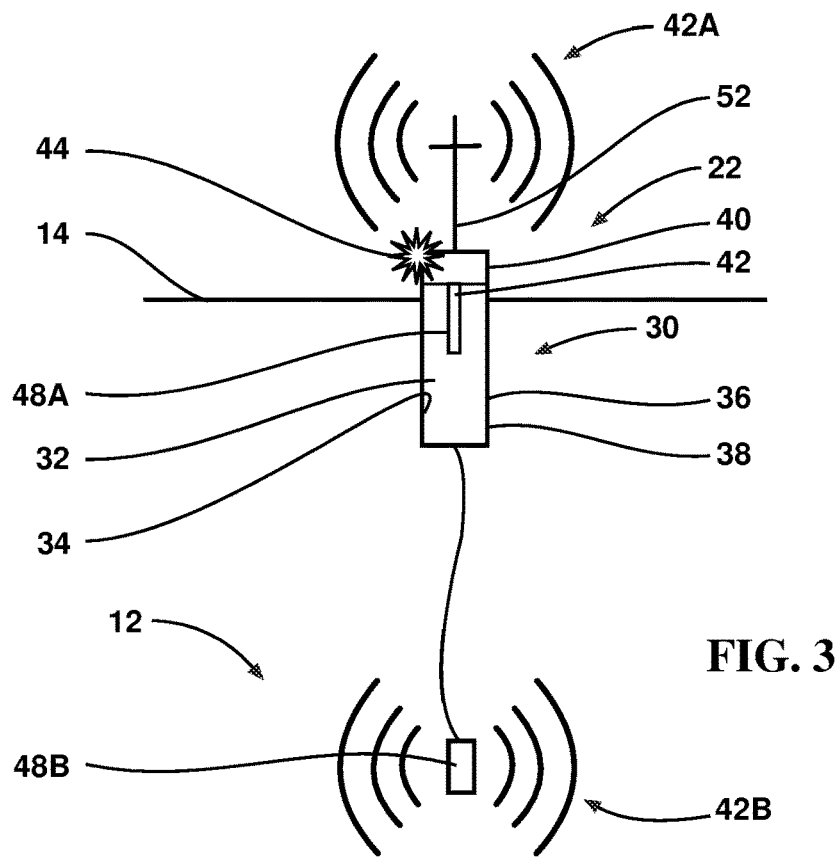
FIG. 3 is a schematic side view of a buoy in operation.
Figure 4:
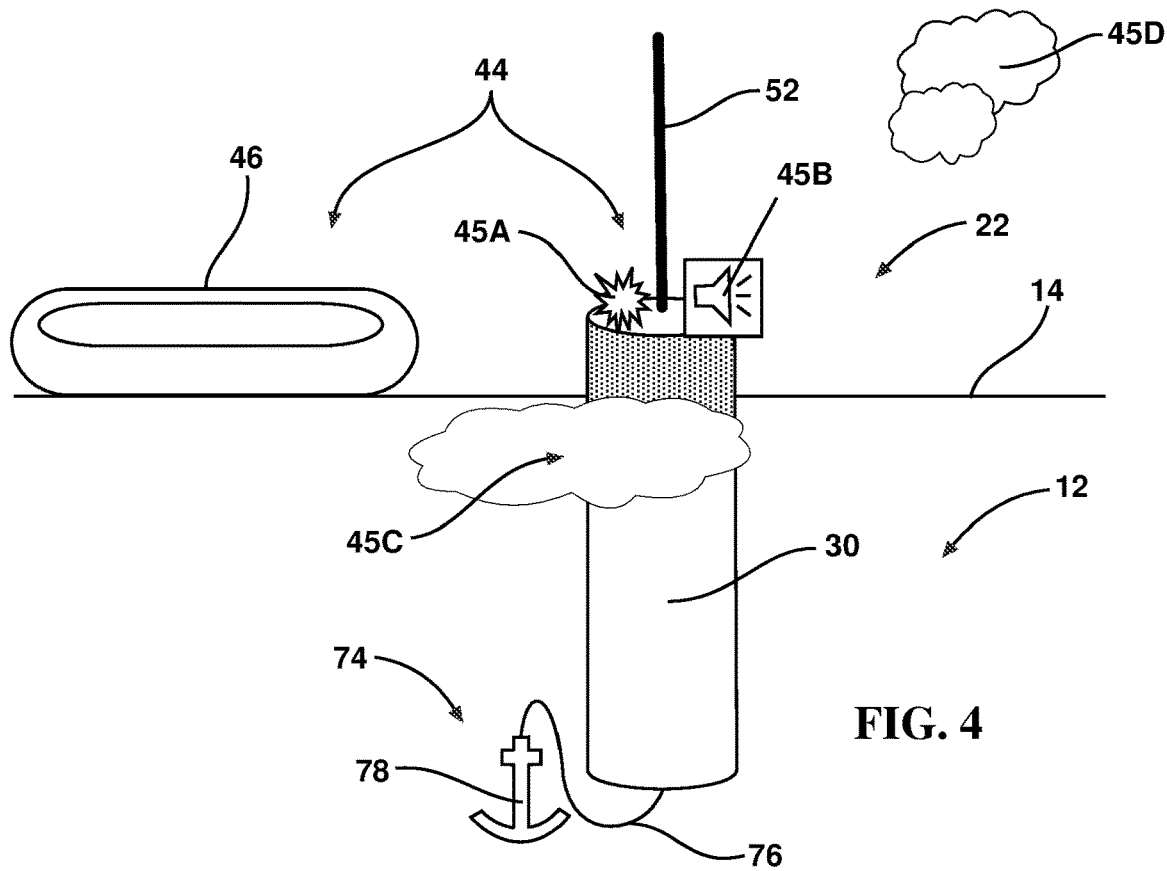
FIG. 4 is a schematic perspective view of a buoy in operation.

FIGS. 2-4 show several non-limiting embodiments of one of the buoys 22. FIG. 3 shows that the buoy 22 comprises a housing 30 having an interior space 32, an interior surface 34, and an exterior surface 36. The housing 30 may comprise a body 38 and a closure (or cap) 40. The buoy 22 is a specialized buoy that comprises a buoy communication device 42, along with at least one remotely activatable device 44. The buoy communication device 42 is configured for sending a signal to at least one other buoy 22 or a base station 28, and for receiving a signal from a remote source. The remotely activatable device 44 is activated and/or deployed by the buoy when a signal is received from a remote source. The term "remote", as used herein, refers to a place that is located a distance away from the buoy in issue, such as another buoy 22, the personal communication device 26, or the base station 28.

The buoy(s) 22 can be of any suitable size and configuration. In some cases, the buoys 22 are watertight canister-shaped objects. The general size and shape of the buoy can be cylindrical and similar to that of an undeployed sonobuoy. This size and shape lends itself to being stored and/or launched from existing sonobuoy systems on aircraft and submarines. The buoys may have a center of mass (COM) that is lower than their center of buoyancy (COB). As shown in FIG. 3, the buoys 22 may, therefore, float in a stable upright position with their antennas pointed upward and above the waterline 14. In some cases, the buoys 22 may comprise buoyant material within their interior space in order to assist in maintaining the buoys 22 in the desired orientation.

The buoy communication device 42 (shown in FIG. 3) may comprise one or more mechanisms for, or mediums of communication. In some cases, the buoy 22 can be provided with at least two mediums of communication: a low power, low frequency, long-range radio frequency (RF) communication 42A; and a low power, long range underwater acoustic communication 42B. Such mechanisms for communication are typically wireless. The RF communication can be provided by an RF transceiver 48A, and the acoustic communication can be provided by an acoustic transceiver 48B. The buoy communication device 42 is associated with the housing 30. The term "associated with", as used herein, means that one component is located within, or on another component. The buoy communication device 42 may comprise one or more portions, such as RF transceiver 48A, that are located inside the housing 30. The buoy communication device 42 may also comprise one or more portions that are located outside the housing and are joined at least indirectly to the housing 30 such as acoustic transceiver 48B, or are joined directly to the housing, such as antenna 52.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element.

The buoy communication device 42 can provide for communication between buoys 22, the personal communication device 26, and the base station 28. In addition, the buoy communication device 42 can provide a range finding function to other buoys 22 based on the timing of the audio or RF signals received by the buoys. The buoy communication device 42 can utilize the different mediums of communication (e.g., radio frequency and underwater acoustic) synergistically (such as by alternating the same) to enhance the range finding function. This can be used to assist in determining the location of the isolated person and the other buoys. The acoustic device can be used to find the range and direction of other buoys in the network via the timing and relative direction of sent and received signals. The location of the person to be rescued can be determined by triangulation and communicated through the buoy network to the base station 28.

Each buoy 22 is controlled via electronics that establish communication channels between the various buoys, and that also control the activatable device 44 associated with the buoy. Communication channels are also established between at least one of the buoys 22 and the personal communication device 26, and between at least one of the buoys 22 and the base station 28.

The buoy 22 can be provided with at least one remotely activatable device 44 that is activated and/or deployable by the buoy when a signal is received by the buoy communication device 42 from a remote source. The term "deployable", as used herein, refers to activatable devices that are movable from one position into another position for use when activated (as opposed to merely being turned on like a light). In some cases, a plurality of the buoys 22 in the buoy network may be provided with at least one remotely activatable device 44. In some cases, all of the buoys 22 in the buoy network may be provided with at least one remotely activatable device 44. The activatable device(s) 44 may be associated with the buoy housing 30. The activatable devices 44 may, for example, comprise a signaling device 45 and/or an assistance device 46 that is deployable from the buoy 22.

The signaling device 45 may comprise any type of device that is useful in finding a person on a body of water, warning others of the presence of a person on the water, and/or rescuing a person on the body of water. The signaling device 45 may be used to bring the attention of rescuers to the buoy 20 that is nearest the person who needs to be rescued and/or to warn others of the presence of a person on the water so they will not collide with the person. The signaling device 45 may include, but is not limited to one or more of: a light 45A, an audible sounding device (or siren) 45B, a dispenser for a visible water appearance change material 45C, and/or a smoke generator for creating smoke 45D. The light 45A can comprise a strobe light (infrared or visible). The water appearance change material dispenser can comprise a dye dispenser or a film generating material dispenser that dispenses a material that forms a visible film 45C on the surface of the water. Such film generating material may, for example, be a biodegradable oil. In some cases, the buoy 22 may comprise a collection of several, or all, of such signaling devices, any of which could be triggered on an individual buoy via the buoy communication network.

Figure 5:
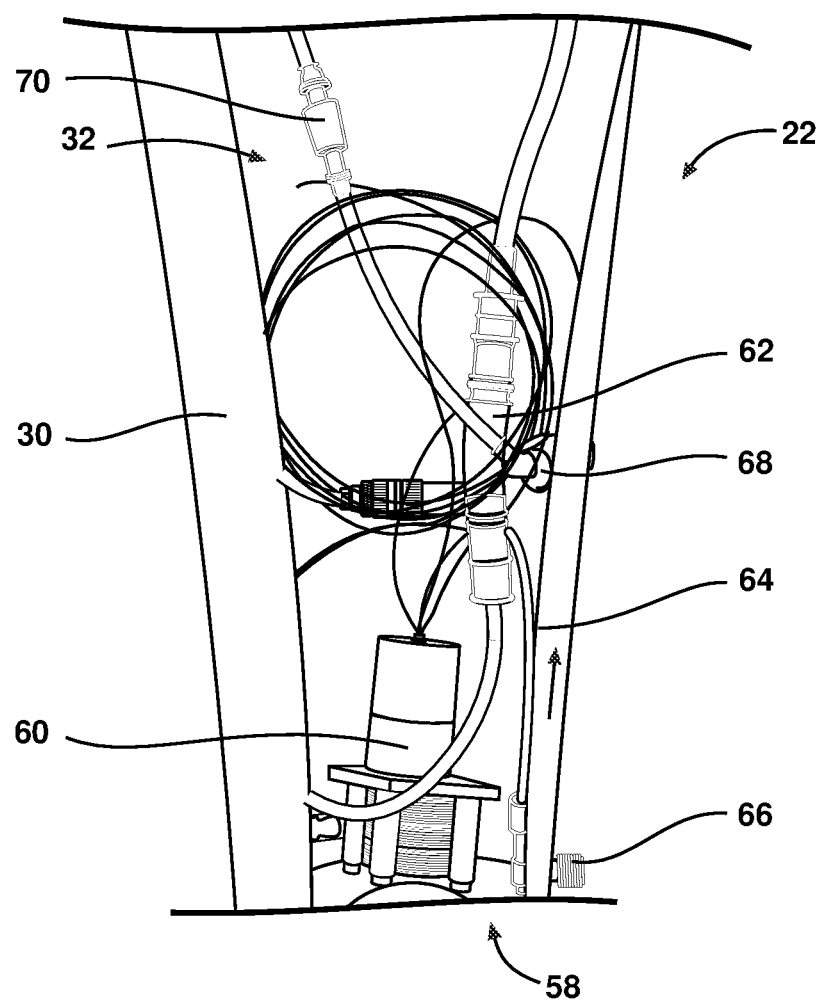
FIG. 5 is a cut away perspective view of a portion of buoy showing some of the components inside the buoy.

FIG. 5 shows that the water dye (e.g., sea dye) dispenser or oil slick generator module 58 comprise a pump (such as an electric pump) 60, a holder/dispenser 62 for either powdered or concentrated sea dye or oil slick material, plastic tubing 64, a water intake (on bottom) 66, an outlet 68, and a one-way valve 70. The pump 60 runs water through the holder/dispenser 62 which mixes with the dye/oil material, and the mixture is dispensed out an exit tube to the outlet 68. In some embodiments, the sea dye or oil may be deployed by an electro-explosive mechanism.

In some embodiments, the activatable device(s) 44 may exclude one or more of the foregoing types of devices, including but not limited to, for example, a strobe light or a smoke generator. The activatable device 44 can also exclude other types of devices including probes, such as probes for penetrating ice.

The assistance device 46 may comprise any type of article or device that is useful in assisting and/or rescuing a person on the body of water. In some embodiments, the assistance device 46 may comprise a life raft. In some cases, the assistance device 46 may be deployable from the interior of the buoy housing 30. In other cases, the assistance device may be joined to the exterior of the buoy housing 30, or be located in a separate compartment joined to the exterior of the buoy housing 30, and may be deployed therefrom. Various types of mechanisms can be used to deploy the assistance device 46. For example, a raft may be deployed using an electro-pneumatic mechanism.

The buoy 22 further comprises a power source electrically connected to the buoy communication device 42 and control circuit to power the buoy communication device and deploy the activatable device 44. The power source can be conventional, and is not shown. The buoy 22 can be battery powered and have a finite lifespan of operation in the water. Alternatively, the buoy can use rechargeable batteries and include a solar cell or other means for converting sea energy into charging current for the rechargeable batteries.

FIG. 4 shows that the buoys 22 can also include an anchoring system 74 to prevent the buoys 22 from drifting and possibly grouping together in response to prevailing sea currents and eddies. The anchoring system 74 may comprise an anchor that can be deployed from the buoy 22, such as from the bottom of the canister. The anchoring system 74 can comprise a high strength line (or rode) 76 that is joined to an anchor 78. Such an anchoring system 74 can be deployed in shallow areas so that it can reach the bottom surface of the body of water. If the anchor 78 is not deployed in shallow areas, the anchor rode 76 can be 20-30 feet long, and the anchor 78 can comprise a weight for reducing the tendency for the buoy to drift since it is believed that the majority of movement of a body of water, such as an ocean, occurs near the top of the surface. Alternatively, the anchoring system 74 can comprise a sea anchor. In some cases, the sea anchor can comprise the parachute 80 used to air drop the buoy.

The buoys 22A, 22B, 22C, etc. are intended to be deployed in a mesh configuration across a large area of water to provide a communication network across the desired area. The buoys 22 can be deployed in any suitable manner including, but not limited to by dropping them from an aircraft with a parachute 80 attached to the buoy; by launching them from a ship; and by deploying them from a submarine.

More powerful and/or longer-range radios will allow the buoys 22 to be spaced further apart. The further apart the buoys 22 can be placed, the larger an area of water can be covered with fewer buoys (and less cost, and less maintenance). The buoys 22 can be spaced so that they are within line of sight of each other. In some cases, the buoys 22 can be spaced apart 1 mile or less (e.g., 500 or 1,000 yards). In other cases, the buoys 22 can be over the horizon from each other and spaced apart at distances of 20 miles or more. At least one of the buoys 22 may be within the range of a base station 28. If the base station 28 is on an aircraft, it may be desirable for a buoy 22 to be less than about 60 miles therefrom (for example, about 35 miles therefrom).

The buoy(s) 22 can serve as a network communication node, to be used in a mesh network with other such buoys as nodes that further includes signaling or assistance devices. The benefit of a mesh network is that a message can be transmitted to every node in the network simply by communicating with one node of the network. Each node is within transmission distance of at least one other node. Therefore, a message that is communicated to one node can be "flooded" across the whole network via sequential relaying of the message until the whole network is covered.

The personal communication device 26 is typically waterproof and can be a hand held device, or it can be a device that is joined to a life jacket or article of clothing. The personal communication device 26 can be any suitable type of device that allows a user to communicate with the buoy network, and optionally with the base station 28. The personal communication device 26 can, for example, be: a radio that is in the possession of a pilot of an aircraft who has ejected from an aircraft or who has landed an aircraft on a body of water; a military hardened tablet with a communications application thereon; a laptop with a radio communication feature; a radio with canned messaging capability; a radio frequency mesh network communication device; or a cell phone. The personal communication device 26 can be used to send and/or receive messages in any suitable manner. In some cases, the communication device 26 can be one that a person can use to type, read, send, and receive text messages from within the buoy network or to a base station outside the buoy network.

The base station 28 may be located on land, on a ship, or on an aircraft. The base station 28 may be staffed by personnel who can receive messages from the buoy network 24 and can send text messages, or any other known type of messages, to the isolated person 10. The personnel at the base station 28 can also determine which buoy to activate in order to provide assistance to the isolated person.

In settings such as in the ocean, or on a public beach or lake, the buoys 22 can be used as a network for communication and/or for assistance of persons around the buoys (i.e., the buoy can deploy a raft, or trigger strobes to avoid collisions with the isolated person, or provide other assistance). Thus, the various auxiliary functions built into the buoys 22 can be designed and configured to help a person nearby.

Various alternative embodiments of the communication systems described herein are possible. In some cases, all of the buoys 22 in the network may comprise the same type of activatable device or combinations of activatable devices. In other cases, one or more of the buoys 22 in the network may comprise a different type of activatable device or combination of activatable devices than the other buoys. Various additional functionality can be added to the buoys 22 including providing them with one or more sensors to gather data on the maritime environment and reporting any findings back to the central base 28 via the communication network of buoys.

In addition, it should be understood that some of the steps of the methods may be modified, and/or the order of at least some of the steps of the methods described herein may be varied and the methods will still accomplish the desired purpose. For example, if the person is within communication range of the base station 28, then the message need only be sent by the person to the base station. In addition, if the person to be rescued in not within communication range of the base station, but the buoy closest to the person to be rescued is within range of the base station, then the message need only be sent to the closest buoy and then to the base station. The signal to activate the activatable device in one or more buoys can similarly be sent directly from the base station to the buoy (if the buoy is within range), or indirectly from the base station through one or more buoys in the network (if the base station is not within range) of the buoy to be activated.

The communication systems 20 described herein can provide a number of advantages. It should be understood, however, that these advantages need not be required unless they are set forth in the appended claims. The communication systems and methods provide reliable, long-range communication over the horizon without satellites. The communication system 20 is a low-cost system that does not require favorable atmospheric conditions to be effective. The communication system 20 provides remotely activatable assistance devices to help rescuers find an isolated person and assist the isolated person.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A rescue buoy comprising:
   a housing having an interior space, an interior surface, and an exterior surface;
   a buoy communication device associated with the housing, said buoy communication device being configured for sending a signal to at least one of another buoy and a base station, and receiving a signal from a remote source, wherein the remote source comprises at least one of: another buoy, a base station, and a personal communication device, and wherein the buoy communication device is configured to send and receive text messages to and from a personal communication device, and to send and receive text messages to and from one or more of: another buoy or a base station; and
   a remotely activatable device associated with said housing that is activatable by said buoy when a signal is received by said buoy communication device from a remote source, said activatable device comprising at least one of: a signaling device, or an assistance device that is deployable by said buoy; and
   a power source electrically connected to said buoy communication device to power said buoy communication device and activate said activatable device.

2. The rescue buoy of claim 1 wherein the buoy communication device comprises at least one of a radio frequency (RF) communication device and an underwater acoustic communication device.

3. The rescue buoy of claim 1 wherein said activatable device comprises at least one of: a light; an audible sounding device; a dispenser for a visible water appearance change material; an inflatable raft; and a smoke generator.

4. A marine communication system comprising a plurality of spaced apart rescue buoys wherein each buoy comprises a buoy communication device that is in communication with at least one other buoy to form a buoy communication network, said buoy communication device being configured for sending a signal to at least one of another buoy and a base station, and receiving a signal from a remote source, wherein each buoy is configured to transmit messages across the entire network through the sequential relaying of the message and at least one of said rescue buoys comprises a remotely activatable device.

5. The marine communication system of claim 4 wherein said buoys are configured into a mesh communication network.

6. The marine communication system of claim 4 further comprising a personal communication device that a person can use to communicate with the buoy network.

7. The marine communication system of claim 4 wherein the buoy communication network is configured to transmit messages over the horizon.

8. The marine communication system of claim 4 wherein the remote source comprises at least one of: another buoy, a base station, and a personal communication device.

9. A marine communication system comprising a plurality of spaced apart rescue buoys wherein each buoy comprises a buoy communication device that is in communication with at least one other buoy to form a buoy communication network, said buoy communication device being configured for sending a signal to at least one of another buoy and a base station, and receiving a signal from a remote source, wherein at least one of said rescue buoys comprises a remotely activatable device, wherein the buoy communication device is configured to send and receive text messages to and from a personal communication device, and to send and receive text messages to and from one or more of: another buoy or a base station.

10. The marine communication system of claim 4 wherein said activatable device comprises at least one of: a light; an audible sounding device; a dispenser for a visible water appearance change material; an inflatable raft; and a smoke generator.

11. The marine communication network of claim 6 wherein the personal communication device is configured to allow a user to type, read, send, and receive text messages with said buoy communication network.

12. A method for rescuing a person on a body of water, wherein said person has a personal communication device, said method comprising:
   a) providing a plurality of networked communication buoys on a body of water prior to said person needing to be rescued, said buoys being provided with a buoy communication device that is configured for sending a signal to at least one of another buoy and a base station, and for receiving a signal from a remote source, wherein said buoys are in communication with at least one other buoy, wherein at least one of said buoys comprises a remotely activatable device that is activatable by said buoy when a signal is received by said buoy communication device from a remote source, said activatable device comprising an assistance device that is deployable by said buoy;
   b) spacing said buoys apart in said body of water so that each buoy is in communication range with at least one other buoy;
   c) sending a message by a person on a body of water from said personal communication device;
   d) receiving said message by a first buoy;
   e) transmitting said message from said first buoy to at least one additional buoy and then to a base station; and
   f) transmitting a signal from said base station to remotely activate said activatable device in said at least one buoy to assist in the rescue of the person.

13. The method of claim 12 wherein said wherein the buoy communication device is configured to send and receive text messages from a personal communication device, and to send and receive text messages to and from said buoy to and from one or more of: another buoy or a base station.

14. The method of claim 12 wherein said activatable device comprises at least one of: a light; an audible sounding device; a dispenser for a visible water appearance change material; an inflatable raft; and a smoke generator.

15. The method of claim 12 wherein the location of a person to be rescued is determined by triangulation and communicated through the buoy network to said base station.

16. The method of claim 12 wherein a plurality of said buoys comprise an assistance device, wherein signal is transmitted to remotely activate the assistance device of the buoy that is nearest to the person to be rescued.

* * * * *